Aug. 15, 1944.  E. MINERO  2,355,922
COUPLING DEVICE
Filed Jan. 8, 1944
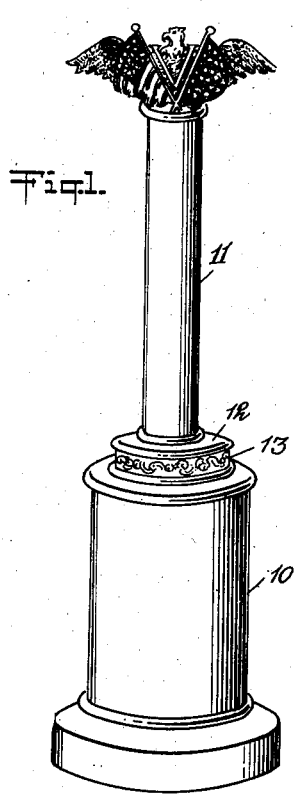
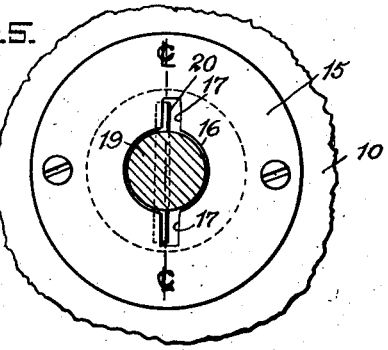
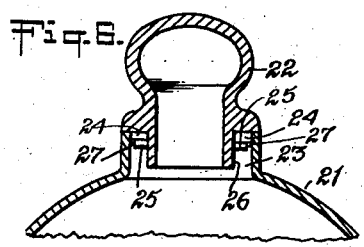
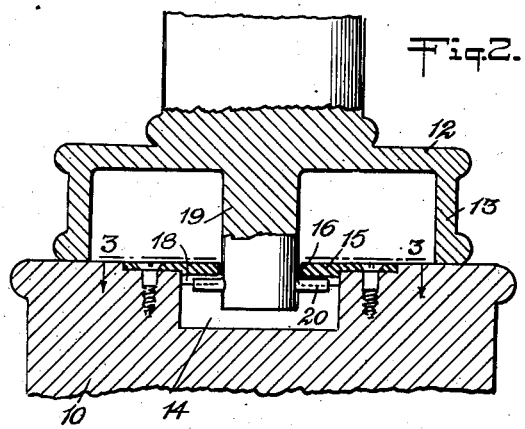
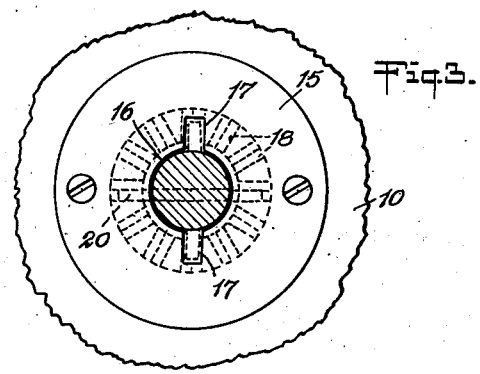
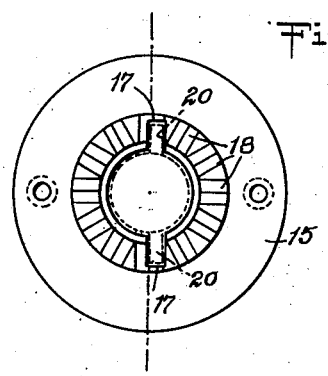
INVENTOR.
*Eligio Minero*
BY
*Edward L. Mueller*
Attorney Patented Aug. 15, 1944

2,355,922

UNITED STATES PATENT OFFICE 2,355,922

COUPLING DEVICE

Eligio Minero, Jersey City, N. J.

Application January 8, 1944, Serial No. 517,487

4 Claims. (Cl. 287—103)

This invention relates to improvements in coupling devices and has particular reference to a device wherein two cooperating members of a coupling are capable of rotative adjustments relative to each other.

In my prior Patent #2,291,975, dated August 4, 1942, there is shown a coupling device in its adaptation to a trophy mounting or the like wherein one of the coupling members in the form of a plate is provided with an opening having diametrically opposed slots, while the other member of the coupling has a post or extension adapted to project through said opening and provided with diametrically arranged pins which pass through said slots when joining the members together. After being so connected, one of said members is rotatable relative to the other so as to position said pins out of alignment with said slots and thus retain the members in cooperative relation and in various positions of rotative adjustment. With the pins of the extension and slots of plate opening diametrically disposed, it is apparent that there are two positions of rotative adjustment of one of said members relative to the other, namely, a half and full revolution, in which the pins and slots will be aligned and thus permit the members of the coupling to be separated.

According to the present invention, it is proposed to eliminate one of said positions so that the members of the coupling may be retained in cooperative relation in any position of adjustment of one of them short of a complete revolution thereof.

The inventive idea involved is capable of receiving a variety of mechanical expressions some of which, for purposes of illustration only, are shown in the accompanying drawing, wherein—

Fig. 1 is a perspective view showing the coupling device in its adaptation to a trophy mounting.

Fig. 2 is an enlarged vertical section through the coupling of Fig. 1.

Fig. 3 is a section on the line 3—3 of Fig. 2.

Fig. 4 is a bottom plan view of the lower coupling member.

Fig. 5 is a sectional view, similar to Fig. 3, showing the relative positions of the coupling members when one of them has been turned through substantially a half revolution, and Fig. 6 is a fragmentary vertical section illustrating another form of the invention.

In the adaptation of the invention illustrated in Figs. 1 to 5, the numeral 10 indicates the pedestal upon which is mounted the trophy 11. The lower end of said trophy terminates in an enlarged base 12 of inverted cup-shaped formation, the wall 13 of which is adapted to rest upon the upper end of the pedestal 10 when the latter and trophy are assembled. The upper surface of said pedestal is provided therein with a recess 14 and covering said recess is a plate 15 constituting one of the coupling members of the present invention. Said plate is provided with a central opening 16, preferably circular in formation, and is further provided with slots 17 extending laterally from and communicating with said opening. The slots may be oppositely disposed or in other angular relation to each other and, in accordance with the present invention, they are offset laterally or circumferentially with respect to one side of a diametrical center line or lines of said opening for a purpose which will appear in the course of the description. Further, the underside of said plate 15 between said slots is provided with a series of shallow notches 18 extending radially from said openings utilized, as will be seen, for the purpose of frictionally and therefore releasably retaining the coupling members 12 and 15 in various positions of rotative adjustment.

To complete the coupling, the base or coupling member 12 is provided with a centrally disposed, depending post or extension 19 of sufficient length to enable the lower end to project through the opening 16 and into the recess 14 when the parts are assembled, as in Fig. 2. The portion of said lower end which extends into said recess has projecting transversely therethrough a pin 20. It will be understood, of course, that instead of using a single pin, there may be provided two pins or projections. In either event, the pin or pins are arranged on the post or extension in offset relation to the diametrical center of the latter as are the slots 17 in the plate 15 with said pins on the opposite side of the center line from the slots, as shown in Fig. 5. With such arrangement, it will be apparent that to assemble the members 12 and 15, the same are turned relative to each other until the pins and slots are aligned, as shown in dotted lines in Fig. 3, whereupon the pins will pass through said slots, and the wall 13 of said member 12 will rest upon the pedestal 10 and the pins will be positioned in a plane beneath the plate 15 so as to permit of relative rotation of the members of the coupling. One of said members is now rotated in either direction to properly position the trophy 11 with respect to its pedestal and any inscription plate which may be secured to the latter. In so adjusting said member, the pin or pins 20 will successively engage in notches 18 of the plate 15 and when the desired position of adjustment is attained and the pins are engaged in notches, the frictional contact thus effected will be sufficient to retain the elements of the coupling in their adjusted position. Due to the fact that said slots and pins are both offset relative to an adjacent center line passing through the opening 16 and the extension 19, it is obvious that when one of the coupling members has been rotated in the same direction through substantially a half revolution to the position of Fig. 5, the pins will be out of alignment with the slots because of their offset relation and any further slight rotative movement which would align one pin with a slot would position the other pin beneath the plate 15 and the coupling members would remain in their coupled relation and be prevented from inadvertent separation. Consequently, in order to effect such separation, it is necessary after the members have been once coupled by a turning movement of one of the members relative to the other in one direction, to complete a revolution of said member in said direction before the opposed pins and slots can be brought into alignment with each other.

Among other adaptations of the invention, the one illustrated in Fig. 6 is an example of its application to a percolator. As is customary in devices of this nature, the cover or top 21 of the percolator is provided with a removable dome 22. In applying the present invention to a percolator, said parts 21 and 22 form the two members of the coupling and the member or top 21, like the plate 15, is provided with an opening 23 having the slots 24 communicating therewith for receiving the projections 25 formed on the extension 26 of the member 22. As in the construction previously described, the slots 24 and projections 25 are in offset relation to a diametrical center line of the opening 23 and extension 26 so that after the members 21 and 22 are interengaged by the insertion of the projections 25 through the slots 24 and one of the members is given a half revolution in one direction to a position substantially like that of Fig. 5 with the projections and slots in parallel relation, another half revolution in either direction will have to be imparted to one of the members before the said members can again be separated by realignment of the projections with the slots. The under surface of the member 21 may be provided with notches 27 like those of the plate 15 so that the members 21 and 22 will be frictionally retained in various positions of adjustment.

What is claimed is:

1. In a coupling device, the combination of two separable members forming an assembly, said members being rotatable relative to each other and one of them having an extension provided with projections which protrude therefrom in offset relation to the diametrical center of the extension, the other member having an opening for receiving said extension when the two members are assembled and further having slots extending from said opening also in offset relation to the diametrical center of said opening and through which said projections pass when assembling said members and separating them from each other.

2. In a coupling device, the combination of two separable members forming an assembly, said members being rotatable relative to each other and one of them having an extension provided with projecting pins, the other member having an opening and slots with which said pins are adapted to be aligned and through which said pins pass when assembling and separating said members, said pins and slots being so arranged relative to their respective members that after the pins have been aligned with and inserted through said slots to join said members and one of the latter is rotated relative to the other in one direction to couple the two members together, a complete rotation of said member from its original position in said direction will be required to again align said pins and slots to permit withdrawal of the pins therethrough.

3. In a coupling device, the combination of two separable members forming an assembly, said members being rotatable relative to each other and one of them having an extension provided with projecting pins, the other member having an opening and slots with which said pins are adapted to be aligned and through which said pins pass when assembling and separating said members, said pins and slots being oppositely disposed in their respective members in such manner that after said members have been joined by the alignment of said pins with said slots and inserted therethrough and one of the members is rotated a half revolution in one direction, at least another half rotation of said member in said direction is required to again align said pins and slots preliminary to the separation of said members.

4. In combination, two relatively rotatable members forming a coupling with one of them having an opening and slots communicating with said opening, the other member having an extension and pins extending laterally therefrom for insertion through said slots, said pins and slots being offset relative to the diametrical centers of said extension and opening, respectively.

ELIGIO MINERO.